Figures 8, 9:
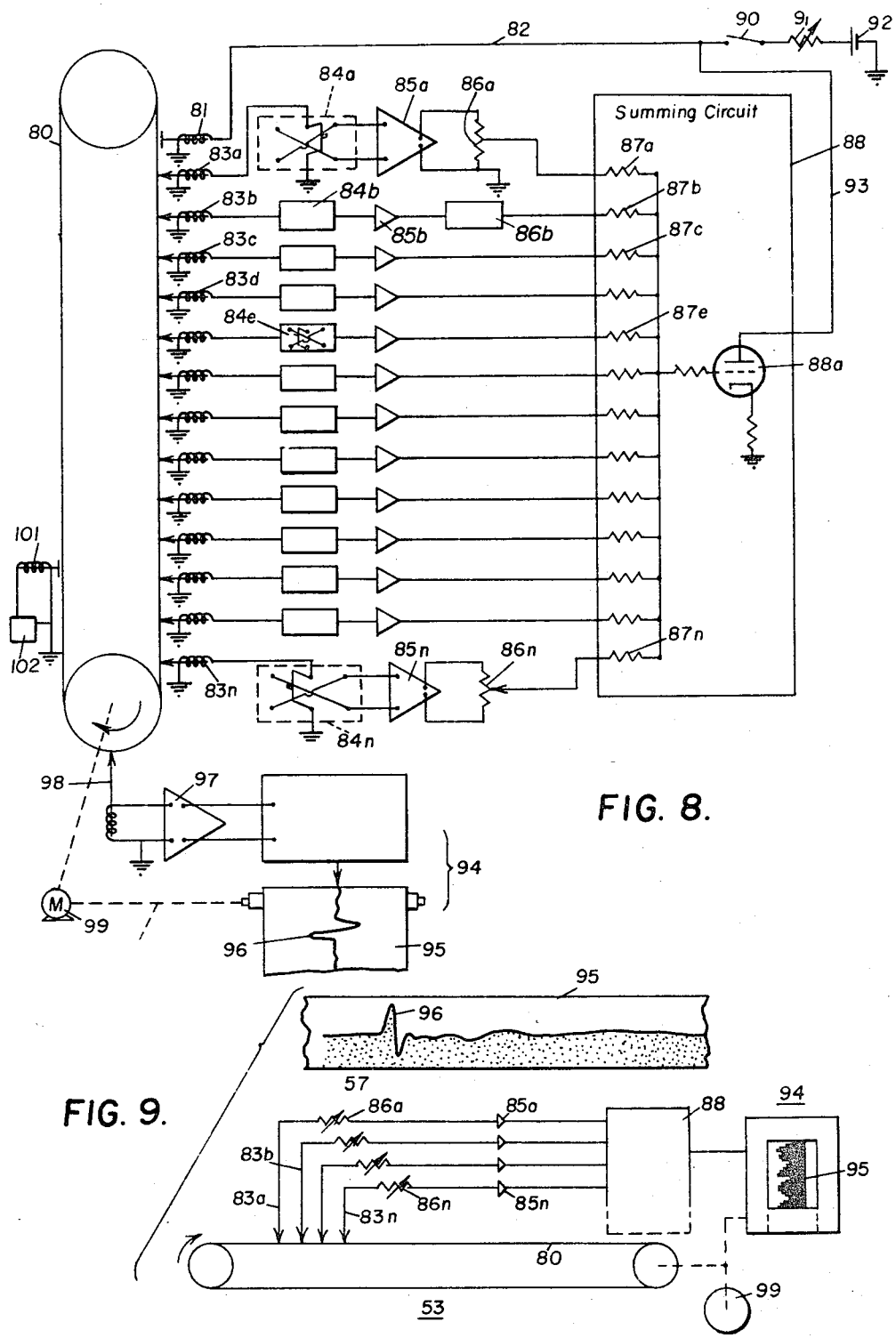

Jan. 29, 1963 P. L. LAWRENCE 3,076,176
FIRST BREAK CONTROLLED INVERSE SEISMIC FILTERING
Filed June 27, 1957 3 Sheets-Sheet 1
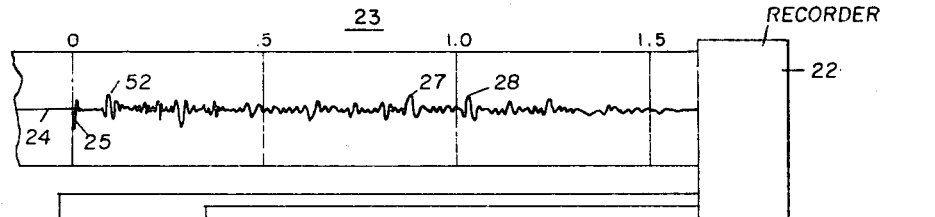
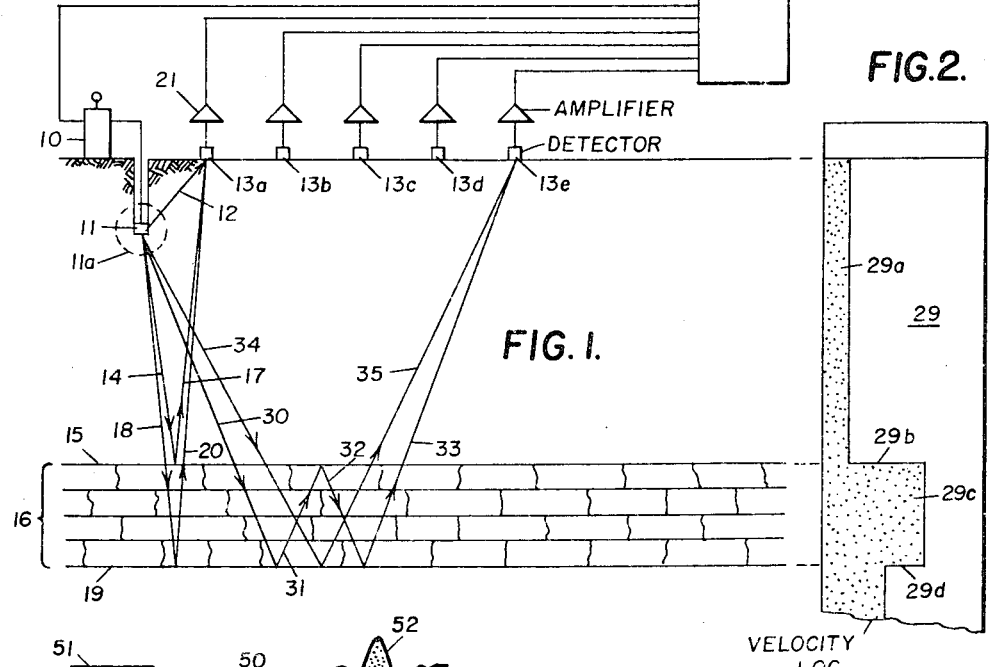
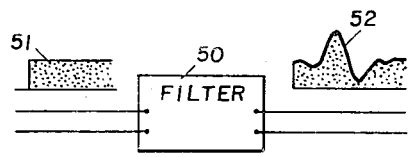
FIG.3A.
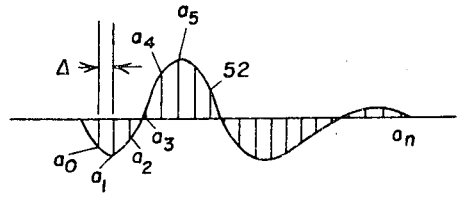
FIG. 6.
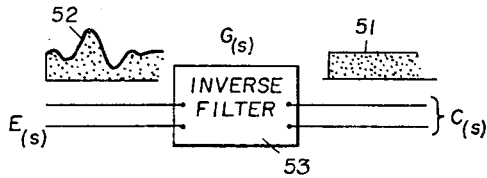
FIG.3B
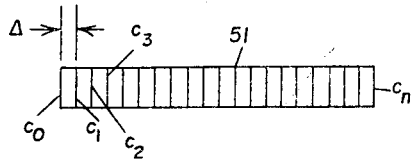
FIG. 7.

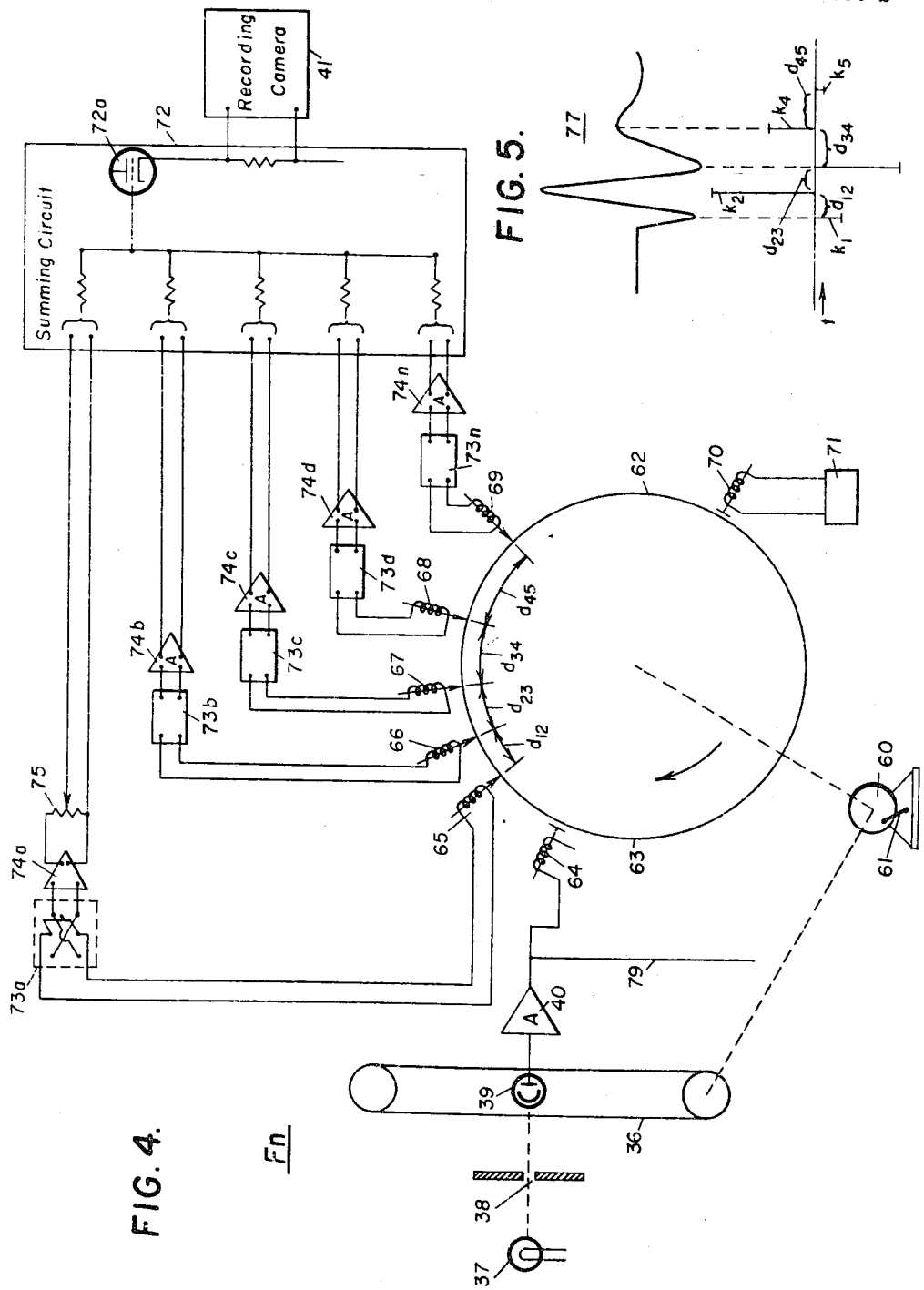

Jan. 29, 1963   P. L. LAWRENCE   3,076,176
FIRST BREAK CONTROLLED INVERSE SEISMIC FILTERING
Filed June 27, 1957   3 Sheets-Sheet 3

3,076,176
FIRST BREAK CONTROLLED INVERSE
SEISMIC FILTERING
Philip L. Lawrence, Dallas, Tex., assignor, by mesne assignments, to Socony Mobil Oil Company, Inc., New York, N.Y., a corporation of New York
Filed June 27, 1957, Ser. No. 668,546
7 Claims. (Cl. 340—15.5)

This invention relates to methods of and systems for extending the usefulness of seismic data available on phonographically reproducible records or in the conventional form of field seismograms and more particularly to producing from a seismogram a time function having a form primarily representative of subsurface velocity layering and having instrumental distortion removed.

An object of the present invention is to provide an improvement upon the methods and means claimed in copending application of Philip L. Lawrence and Manus R. Foster, Serial No. 668,569, filed June 27, 1957, for Elimination of Instrumentation Distortion. More particularly, it is an object of the invention to obtain from conventional seismic data more accurate and definitive identification of the lithology of subsurface strata which give rise to reflections of seismic waves or signals.

In accordance with a further object of the invention, a particular wavelet is utilized for the conversion of the seismic information on the seismogram from its coordinates of amplitude and time to coordinate representative of formation velocity and time. More particularly, seismic data, i.e., a seismogram as a whole, is converted to a function representative of velocity contrast, free of distortion, with a time base related to that of the field seismogram.

Yet another object of the invention is to produce from seismic data, as for example a field seismogram, a record representative throughout the depth of earth penetrated by the seismic waves of the formation velocity characteristics of the same nature and character as that obtained by continuous well logging velocity surveys.

In carrying out the invention in one form thereof there is provided a seismogram on which subsurface velocity features appear as complex waveforms resulting from direct travel of energy from the seismic source to a detecting station and from the reflection of seismic waves from subsurface velocity interfaces. The seismogram is then filtered by passing signals representative of the complex waveforms through a filter characterized by an impulse response the inverse of one corresponding with the waveform of said direct traveling energy from said seismic source to said detecting station.

In accordance with a further object of the invention there is provided a filter for seismic signals which is characterized by an impulse response the inverse of the impulse response which corresponds with direct traveling or uphole seismic signal waveforms.

In accordance with a further object of the invention there is provided a method and apparatus for filtering seismic signals to remove distortions of the seismic waves introduced by the mechanism for generating seismic waves and the instrumentation employed for detecting and recording such seismic waves.

In accordance with a further aspect of the invention, there is provided a method of seismic exploration which comprises generating seismic waves, detecting seismic waves traveling directly from the point of generation to a detecting station, detecting seismic waves after travel to and reflection from subsurface reflecting horizons as they appear at a detecting station, restoring to said seismogram frequency components attenuated at the point of generation and at the detecting station in an amount and at relative phase angles as to complement a function representative of an impulse response the inverse of one corresponding with the waveform of said direct traveling energy to produce a time function free from system distortion and representative of velocity layering of subsurface formations.

In further carrying out the present invention, a seismogram of the kind normally taken in the field is converted to a velocity log which by the character of the record thereof corresponds with incremental velocity logs which would be obtained had a well bore been available in the area over which the conventional seismogram was obtained. The conversion of a conventional seismogram to a record corresponding with that of a continuous velocity log is accomplished by transforming an electrical signal, representative of a single pulse for a selected portion of the seismogram to one identical with a predetermined pulse waveform. After this transformation has been accomplished, the same transformation is made with respect to the seismogram as a whole to produce therefrom a velocity log of the entire subsurface depth covered by the seismogram.

In one form of the invention, the seismogram is converted to a velocity log by means including a time-domain filter to which are applied one or more electrical signals representative of waveforms appearing on the seismogram. The filter is adjusted for transformation of the selected unique electrical signal to an output signal which substantially corresponds with the unique subsurface velocity feature as it would appear on a velocity log. While identity as between the output signal from the filter and that representative in a velocity log of the distinctive subsurface layer is the ultimate objective in accordance with the invention, it is to be understood that useful velocitiy logs can be obtained without exact correspondence between the output signal of the filter and that obtained in the field. The usefulness of such velocity records where borehole logs of velocity are not available will be recognized when it is realized that, with the limitations known in advance, the converted log may be a far more useful interpretative tool than the original record.

For a discussion of additional background theory, a more complete understanding of the present invention, and for further objects and advantages thereof, reference may now be had to the following description taken in conjunction with the accompanying drawings in which:

FIG. 1 illustrates a seismic exploring system;
FIG. 2 is an idealized velocity log of the lithology illustrated in FIG. 1;

FIGS. 3A and 3B diagrammatically illustrate respectively a conventional filtering system and an inverse filtering system;

FIG. 4 diagramamtically illustrates a time-domain filter;

FIG. 5 includes a waveform and associated diagram;

FIGS. 6 and 7 illustrate respectively a waveform uniquely identifying a subsurface bed of known character, a unit input function, and the sampling technique used for the time-domain filter of FIG. 8;

FIG. 8 diagrammatically illustrates a time-domain filter; and

FIG. 9 diagrammatically illustrates the inverse filter for transforming a seismogram into a velocity function of layering over the depth covered by the seismogram.

Inasmuch as a thorough understanding of conventional seismic exploration is an essential prerequisite to the development of the background theory upon which the present invention is predicated, reference will first be had to FIG. 1 which diagrammatically illustrates a conventional seismograph system. Upon actuation of a blaster 10, a source of acoustic energy such as a small charge 11 of an explosive such as dynamite produces an acoustic pulse. While other forms of seismic wave generators may be utilized, the detonation of an explosive is conventionally employed. Seismic waves thus generated travel from the shot 11 downwardly through the earth strata and also by way of a more or less direct path 12 to the first detector or geophone 13a. The downwardly traveling wave, as along the path 14, is reflected from the upper surface 15 of a relatively thick high velocity bed 16. The reflected wave travels along the path 17 to the detector 13a. Seismic energy also travels by way of a path 18 to a reflection point at the bottom 19 of the bed 16, this energy returning by way of path 20 to the detector 13a. Electrical signals generated by the detector 13a are applied to an amplifier 21 which may include the usual adjustable filters. The output from amplifier 21, in turn, is applied to a recorder 22.

The amplified output from amplifier 21 is applied to the recorder 22 which produces a seismic record 23. The usual form of this record comprises an elongated strip of photographic paper onto which there has been projected a plurality of light beams to create through exposure of the sensitized paper a plurality of undulating lines or traces corresponding with the electrical signals generated by the detectors, five of which, the detectors 13a–13e, have been illustrated. Only one such trace 24 has been illustrated on record 23.

There first appears on the trace 24 a pulse 25 at time of zero which corresponds with the instant of detonation of the explosive charge 11. There immediately follows a high amplitude "first-break" or "uphole" signal 52 (due to the travel of the wave along the path 12) followed by distinctive energy bursts at 27 and 28. The single trace 24 is to some extent idealized, and the distinctive bursts 27 and 28 are representative of the reflection waveforms resulting from the reflection of the seismic energy from the top 15 and bottom 19 of the bed 16. The waveforms 27 and 28 are distinctive in character and stand out in substantial amplitude contrast with respect to the remaining portions of the trace 24.

In seismograms obtained in the field, many reflections such as 27 and 28 are likely to be less pronounced and to be somewhat submerged in a background of noise or other reflection energy. In some instances, the reflections 27 and 28 may be obscured and changed in character by reason of multiple reflections arriving at the same time as energy representative of the main event of interest. For example, if seismic energy traversing the path 30 now be considered, it will be seen that it is reflected from a point on the lower surface 19. From there, it travels by way of path 31 to a point on the upper surface 15. It is then reflected downwardly along path 32 and finally from the lower surface 19 is reflected along a path 33 to the detector 13e.

Seismic energy traversing the path 34 is reflected from a point on the bottom surface 19 to the detector 13e along the path 35. Accordingly, the detector 13e will respond not only to the strong primary event, the energy traversing path 34, but also to a somewhat attenuated secondary event spaced in time by an amount equal to the round-trip travel time (i.e., along paths 31 and 32) of the pulse within the confines of the bed 16. Output signals from detectors 13a–13d similarly will include components representative of multiply reflected events.

The waveforms 27 and 28 for the purpose of this description are assumed to represent bursts of energy reflected from the top 15 and bottom 19 of the bed 16, FIG. 1, respectively. If a log of the acoustic velocity of the section shown in FIG. 1 were to be obtained as by penetrating formations with a borehole and following the procedures described in Patent No. 2,704,364 to Gerald C. Summers, a co-worker of applicant, such a log in idealized form would be of the character illustrated in FIG. 2. The earth section above boundary 15 is assumed to be of constant velocity as represented by the uniform section 29a. At a point along log 29 correspondnig with the depth of boundary 15 there is an abrupt velocity discontinuity or step 29b with a subsequent section 29c of uniformly high velocity followed by a step 29d following which velocity is lower.

It will be remembered that the length of seismogram 23 is representative of time and that the length of log 29 is scaled in depth. However upon suitable conversion of one to the other it may be found that reflections 27 and 28 may be attributed to the velocity contrasts represented by steps 29b and 29d. In continuous velocity well logging procedures such as disclosed in the above-identified Summers patent, the depths of velocity discontinuities may be located with accuracy. The magnitude of the contrasts may be clearly depicted so that not only is there provided an indication of subsurface layering but also there is provided in considerable detail the character of the formations through which the log 29 is secured. In order to obtain such a continuous velocity log, however, it will be readily recognized that the presence of a borehole is indispensable.

In accordance with the present invention there is provided an indicia of the velocity profile without the necessity of a drill hole extending to depth. Since on a velocity log such as log 29 the interfaces 29b and 29d are of the nature of a step function, it will be seen at once that if the reflection components recorded on trace 24 are converted into steps, such steps could then be interpreted in terms of velocity layers and the resultant seismogram would take on the character of a velocity log and would have greatly enhanced value.

Thus the objective of the present invention is to convert a field seismogram such as seismic trace 24 to a velocity log.

If the reverse operation be considered for a moment, i.e., the conversion of step 29b on the velocity log 29 to the waveform 27, the underlying philosophy of the present invention will be more readily understood.

For example, if there be applied an impulse such as a unit step 51, FIG. 3A, representative of variations in pressure following detonation of charge 11, to a filter 50 which represents the combined effects of the spectrum of the shot pulse, attenuation, detection by detector 13a and the filtering in the recording system, there will be produced at the output a waveform 52, the uphole impulse on record 23, FIG. 1. In general, the manner of constructing the filter 50 to convert a step function 51 at the input to the waveform 52 at the output is well understood by those skilled in the art.

Referring now to FIG. 3B, if the uphole waveform 52 be now applied to an inverse filter 53 which transforms the uphole pulse 52 back into the step 51, it will be seen that there will have been achieved a method and mechanism by means of which other impulses such as reflections represented by the waveforms 27 and 28 may be transformed into steps representative of the interfaces 15 and 19 as they appear at 29b and 29d on the velocity log 29, FIG. 2. Having thus established the characteristics of the inverse filter, there may then be applied to the input of the inverse filter 53 signals corresponding with the variations of the trace 24 as a whole for the production of the entire velocity log.

There will now be considered the manner in which there is established the character of an inverse filter to correlate a particular waveform as it appears on the trace 24 and the step which would appear on a continuous velocity log due to the same velocity contrast in the earth which gave rise to a given waveform.

The seismogram 23 is complicated by the fact that the various steps in the production, detection and recording of the seismic waves are each to some extent frequency-selective. This is true of the generation of the seismic signal. More particularly, when charge 11 is detonated it may be assumed that a unit pulse in the nature of a voltage spike or in the nature of a step function such as pulse 51, FIG. 3A, will describe the pressure variation in the vicinity of the explosive charge. Such an assumption may or may not completely qualify the phenomena at the charge site but for the purpose of the present invention such an assumption may be made in order to carry out steps which lead to the production of records of velocity layering from a seismogram. In the zone 11a surrounding charge 11 pressures may exceed the elastic limit of the formation so that transmission of energy from the shot to formations remote from the shot may properly be characterized as non-linear and thus will introduce distortion in the signals.

Non-linearity is also present in detection and may be attributable to the coupling between detectors 13a–13e in the earth. More particularly, the mechanical linkage between the detectors and the earth, i.e., the "detector plant," ordinarily may be considered to be frequency-selective. Amplifier 21 as well as the recording elements in recorder 22 may have frequency-selective characteristics as is generally the case in systems conventionally employed in the production of seismograms.

The foregoing may thus be summarized by concluding that a field seismogram is useful in a broad sense in that it discloses in gross the characteristics of the layering of the earth but lacks precision in revealing details as compared with that obtainable by continuous velocity well logging methods. However, it has been found that through one mode of using an inverse filter such as filter 53, FIG. 3B, the detail which has been lost by the distortion of shot, detector, amplifier and recorder in the conventional system may be restored so that there may be approximated from a seismogram a representation of velocity layering.

In accordance with the present invention it is assumed that the uphole impulse 52 representative of energy traveling along direct path 12 is the *impulse response* of that portion of the seismic system including shot generation, path 12, the coupling between detector 13a and the earth, the response of detector 13a, the response of amplifier 21 and the response of recorder 22.

Based upon the foregoing, there is then provided a filter having an impulse response the inverse of that represented by the uphole impulse 52. Then by filtering the seismogram including reflection components 27 and 28 through such an inverse filter, there will then be produced a representation of a velocity log in which the information removed on a frequency-selective basis in the production of seismogram 23 is restored so that the detail of a velocity log may thus be incorporated. Thus the present invention would eliminate from an ultimate record the distortion introduced by the generation, detection and recording system but would retain the indicia as to velocity layering as incorporated in the various reflection components spaced in time along the seismogram.

Under favorable circumstances the present invention provides a method for producing detailed subsurface layering through the use of a relatively shallow explosive charge and possibly a single channel seismic recording system. The inverse filter provided by reference to the character of the uphole impulse 52 would be unique for any shot and detecting system. While it may be necessary in some cases to provide a different inverse filter for each separate shot, in practice a given inverse filter may be employed for a series of seismic observations. This will be true so long as the frequency spectrum of the shot impulses as they emerge from a non-linear zone into a linear zone remains unchanged from shot to shot in a given area and so long as the coupling between detector 13a and the earth is essentially constant in character from record to record. Insofar as these limitations are not substantially met, then a new inverse filter will be provided for each shot or for each detector location but in any event the key to distortion thus introduced in any record is immediately available in the form of the uphole impulse and from such impulse a filter may be provided for restoring components thus removed by distorting features of the system.

Seismogram 23 of FIG. 1 may originally be recorded in phonographically reproducible form and more particularly of the nature of record 36 of FIG. 4 in which a variable area film is provided, the variations in area corresponding with the signals illustrated as the undulating trace 24 of FIG. 1. A light beam from a source 37 is directed by way of a slit 38 onto a photoelectric cell 39. After amplification by an amplifier 40, the output is applied to a time-domain filter which will later be described.

In the alternative, a photographic record of the type illustrated in FIG. 1 may be transformed manually or otherwise into a phonographically reproducible record of the type of variable area film 36 or in the form of variations in a magnetic field impressed along the length of a magnetizable tape.

For the purpose of the following description an understanding of the functions of a time-domain filter will be desirable since the operations involving an inverse filter will be explained on the basis of time-domain operations. A time-domain filter is illustrated in FIG. 4 and may be devised by reference to an arbitrary waveform 77, FIG. 5, which represents the impulse response of the time-domain filter of FIG. 4.

As shown in FIG. 4, the time-domain filter $F_n$ comprises a drum 62 carrying a magnetic recording medium, such as magnetic tape 63. A recording head 64 of conventional design records on tape 63 the output signals from the amplifier 40. A series of pickup heads, the five heads 65–69 being shown, are spaced along the path of the tape 63 by distances determined as later set forth herein. An erase head 70 energized in conventional manner from a source 71 serves to remove from the tape 63 the signal recorded at the head 64. The circuits between each pickup head and a summing circuit 72 are identical. The circuit from pickup head 65 includes a reversing switch 73a and an amplifier 74a which is provided with a potentiometer 75 for selection of a desired proportion of the signal developed at the output of the amplifier 74a. The components of the corresponding circuits have corresponding reference characters with different subscripts added for each circuit. The subscript "n" for the circuit from pickup head 69 is indicative of the fact that any desired number of circuits may be employed.

The spacing of the pickup heads, the positions of the reversing switches, the setting of the output potentiometers, and the speed of rotation of the drum 62 are matters generally within the knowledge of those familiar with time-domain filtering. Because time-domain filtering involves the convolution of two functions, it can be performed with electrical or magnetic delay lines and by digital computing techniques.

In FIG. 4 the arrangement is essentially a magnetic-drum delay line which is adjusted in accordance with the desired impulse response of the needed filter. The performance of a time-domain filter is precisely determined by its impulse response 77, FIG. 5, the latter being as definitive of its response as the amplitude and phase characteristics under steady-state conditions determine the response of an electrical filter.

Referring now to FIG. 5, the impulse response 77 for the filter $F_n$ is shown with time as abscissae and amplitude as ordinates. The impulse response 77 is illustrative of the response of a filter having a bandpass of from 36 to 72 cycles per second. Below the impulse response 77 is a plot representative of a simplified sampling technique.

The samples have been taken at the peaks and troughs of each leg in the impulse response 77. The spacing between samples in FIG. 5 is satisfactory because that spacing is less than half the duration of the shortest pulse in the input signal. Where it exceeds that amount, more pickup heads will be used and the samples will be taken at closer intervals which will be equally time-spaced one from the other.

In FIG. 4, the potentiometer 75 is set to correspond with the amplitude $k_1$, FIG. 5, at the first sampling point. The pickup head 66 is time-spaced from the pickup head 65 by a distance $d_{12}$ equal to the time spacing between $k_1$ and $k_2$. Similarly, the potentiometers of amplifiers $74b$–$74n$ are set in accordance with the amplitudes $k_2$ to $k_5$ at the sampling points, and the pickup heads 67–69 are spaced apart by the corresponding amounts $d_{23}$, $d_{34}$ and $d_{45}$.

With the time-domain filter $F_n$ adjusted in the foregoing manner, the seismic record to be filtered as appearing on the phonographically reproducible record 36 is driven past the slit 38. The output from the photocell 39 and amplifier 40 is then applied by conductor 79 to other time-domain filters, where used, and to the recording head 64. After the electrical signals have been recorded by the head 64 on the tape 63, they are detected in succession by the pickup head 65–69 and after amplification and attenuation as above described are applied to a summing circuit 72. The summing circuit 72 is shown schematically as including a vacuum tube $72a$ having a coupling resistor extending from its input or grid circuit to the output of each of the amplifiers $74a$–$74n$. A recording camera 41 is shown driven by the cathode output circuit of the tube $72a$.

With the drum speed, spacings and potentiometers established, as above described, the input signal will be modified by the time-domain filter having a passband between 36 to 72 cycles per second. After the length of the record 36 has been moved past the slit 38, and a record made of the output of the filter $F_n$, the speed of motor 60 is adjusted as by the lever 61 to provide a different speed of movement of the tape past the heads 64–70. The magnetic tape, after passage in the direction of rotation beyond the erase head 70, is free by any recorded signals and ready for the next filtering operation. The required speeds of operation are readily determined from the differences to be established between the mid-frequencies of each filter passband.

The arrangement of FIG. 4 has been described at length in order that the following description of the use of such a system may more readily be understood.

There will now be presented a further discussion of background theory as well as a description of how there is obtained the impulse response required for the inverse filter of FIG. 3B. It is within the scope of the present invention to calculate the inverse function by using a digital computer, an electrical or magnetic delay line, or a time-domain filter. That these various approaches are suitable will be evident from a brief consideration of filter theory.

If, in FIG. 3A, an input signal $e(t)$ representative of the pressure pulse 51 produced upon detonation of charge 11 is passed through the filter 50 with a resultant output signal $c(t)$, the output signal 52, the uphole pulse, may be expressed as the result of convolving the input signal with the impulse response of the filter. The foregoing may be mathematically stated as follows:

$$c(t) = \int_0^t e(\tau) g(t - \tau) d\tau \qquad (1)$$

where $g(t)$ characterizes the filter F and is called the impulse response of the filter, and $\tau$ (tau) is the time variable of the integration.

Convolution in the time-domain transforms into multiplication in the frequency-domain. Therefore, the Expression 1 may be written:

$$C(s) = E(s) G(s) \qquad (2)$$

where $$E(s) \triangleq \int_0^\infty e(t) e^{-st} dt \qquad (3)$$

$$G(s) \triangleq \int_0^\infty g(t) e^{-st} dt \qquad (4)$$

$$C(s) \triangleq \int_0^\infty c(t) e^{-st} dt \qquad (5)$$

By definition $\triangleq$ means identically equal to and $s = \sigma + j\omega$; a complex expression of frequency where $\sigma = Re\{s\}$, and where $\omega = \pi f$, with $f$ in cycles per second.

Where a digital computer is utilized, Equations 1, 3, 4 and 5 will be applicable.

For the time-domain filter described in FIG. 4, the problem was to obtain the output waveform, knowing the input and the filter response corresponding with the particular bandpass desired. The same problem is present in FIG. 3A where the input waveform 51 is known and the filter response is known for the production of the output waveform 52.

For the inverse filter 53 of FIG. 3B, the problem is different. The input function 52 and also designated as $E(s)$, Equation 3, is known, as is output function $C(s)$, Equation 5. The problem is to obtain the impulse response $G(s)$ of the inverse filter 53 which will produce the output step function 51 or $C(s)$. The foregoing may be stated mathematically by rewriting Equation 2 as follows:

$$G(s) = \frac{C(s)}{E(s)} \qquad (6)$$

Equation 6 is easily solved in the frequency-domain and has the following inverse transform:

$$g(t) = \frac{1}{2\pi j} \int_{\sigma - j\infty}^{\sigma + j\infty} G(s) e^{st} ds \qquad (7)$$

The inverse transform, Equation 7, is utilized to obtain the waveform of $g(t)$.

Further in connection with the use of a digital computer, the impulse response of the inverse filter 53, FIG. 3B, is obtained by dividing the spectrum of the output signal $C(s)$ by the spectrum of the input signal $E(s)$ and subtracting the phase difference, if any, to obtain the frequency transform of the inverse filter. The solution of the inverse transform, Equation 7, provides the information needed to obtain the impulse response of the filter 53, which filter will then transform the input waveform 52 to the desired output waveform 51.

In the system illustrated in FIG. 8, the impulse response for the inverse filter 53 is obtained directly by utilizing a sampling technique in the time-domain which will be recognized as being similar to the sampling technique already described in connection with FIG. 4. For the purpose of the system of FIG. 8, the following equation is utilized as an approximation of Equation 1:

$$C(n\Delta) = \sum_{m=0}^{n} e(m\Delta)g([n-m]\Delta) \qquad (8)$$

where the waveforms representing the input signal $e(t)$ and the output signal $c(t)$ are represented by a series of equally spaced samples having the amplitudes respectively ilustrated in FIGS. 6 and 7. The time spacing of the samples is $\Delta$ and the total number of samples is $(n+1)$. The various sample amplitudes in the input signal, FIG. 6, are denoted as $a$, with appropriate subscripts. The various amplitudes of the impulse response are denoted in the description to follow by $b$ with appropriate subscripts. Mathematically, the foregoing can be stated:

$$a_m = e(m\Delta) \qquad (9)$$

where $m = 0, 1, 2 \ldots n$.

$$b_{n-m} = g[(n-m)\Delta] \qquad (10)$$

where $m = 0, 1, 2 \ldots n$, and $n = 0, 1, 2 \ldots n$.

It will now be seen that it is possible to solve the equations for the $b_m$ amplitudes necessary to devise the inverse filter 53 using sample values of the input signal 52 and sample values of the output signal 51. The input signal 52 has been reproduced in FIG. 6, and the output signal 51 in FIG. 7. The output signal 51, or as mathematically represented by $c_m$, is everywhere equal to unity after time occurrence of $C_0$. Prior to time occurrence of $C_0$, the output is zero. The input implitudes $(a_m)$ are obtained from the input signal 52 which is representative of the pulse 27 selected from the trace 24 of seismogram 23. The various $b_m$ coefficients may now be computed as follows:

$$C_0 = 1 = a_0 b_0 \quad \text{for } n=0 \qquad (11)$$
$$C_1 = 1 = b_0 a_1 + b_1 a_0 \quad \text{for } n=1 \qquad (12)$$
$$C_2 = 1 = b_0 a_2 + b_1 a_1 + b_2 a_0 \quad \text{for } n=2 \qquad (13)$$
$$C_n = 1 = b_0 a_n + b_{n-1} a_1 \ldots$$
$$+ b_{n-1} a_1 + b_n a_0 \quad \text{for } n=n \qquad (14)$$

Referring now to FIG. 6, an arbitrary amplitude is established for $a_0$. This value will conveniently be assumed to be unity; such an assumption is proper since $a_0$ merely defines the gain of the filter network. The value $a_0$ is obtained at the time interval $\Delta$ following the origin of the waveform 52. The subsequent values of $a$ will be spaced apart by the time interval $\Delta$. Hence, all values of input amplitudes $a_m$ are known from the waveform of FIG. 6. It will be observed that the values of $a_m$ are taken at much shorter intervals of time than were the centroid samplings K of FIG. 5.

Again referring to Equation 11, if $a_0$ is unity, then $b_0$ is equal to unity. Reference may now be had to Equation 12 where it will be noted all values are now known except $b_1$. The equation is readily solved for $b_1$. Similarly, Equation 13 and the intervening equations are solved, the general form 14 of the equation being presented to take care of any desired number of samples $n$. in FIGS. 6 and 7, $n$ is equal to 20.

There has been illustrated in FIG. 8 a system for pregressively obtaining the $b_m$ values necessary to define the impulse response of the inverse filter 53. The system of FIG. 8 broadly comprises a time-domain filter and includes a recording medium 80 of the phonographically reproducible type and illustrated as a magnetic tape. A recording means or head 81 is arranged to place on the record 80 a signal applied by way of a conductor 82. The conductor 82 is connected at one end to a circuit which includes a starting switch 90, a variable resistor 91, and a source of voltage 92 shown as a battery.

A plurality of sensing devices or pickup heads 83a–83n are associated with the magnetic tape 80 for producing in their respective output circuits signals representative of the record on the tape as it passes each of the devices 83a–83n. The signals detected by the pickup head 83a are fed through a reversing switch 84a, an amplifier 85a and a potentiometer 86a to a summing circuit 88 which includes a resistor 87a and a vacuum tube shown as a triode 88a. The output from the summing circuit 88 is applied by way of conductors 93 and 82 to the recording head 81.

The operation of the system of FIG. 8 provides a solution for Equations 8 through 14 and produces by means of a recorder on its record chart the impulse response characteristic 96 of the inverse filter 53 of FIG. 9. The curve 96 has been shown in relatively simple form but ordinarily may be of greater complexity. The recorder 94 may be of the type known as a high-frequency oscillographic recorder. Such recorders include an amplifier 97. The input circuit of the amplifier 97 is connected to a pickup head 98 associated with the magnetic tape 80.

The voltage of the battery 92 and the setting of the variable resistor 91 are such as to apply through the circuit 82 to the recording head 81 an input signal or voltage representative of unity. This voltage corresponds with the $c_m$ values shown in FIG. 7 as $c_0, c_3 \ldots c_n$ which, as already noted, all have values of unity. It will be recalled that the value selected for the $a_0$ value is also unity. Though other values can be utilized for $a_0$, its selection to correspond with unity is useful, as will now be shown.

Referring now to Equation 11, it will be remembered that $a_0$ by definition has a value of unity and, FIG. 6, has a negative value. Accordingly, $b_0$ is equal to $-1$, being the coefficient of the left-hand side of Equation 11 divided by $a_0 = -1$. With a motor 99 energized to drive the tape 80 at a selected speed, the switch 90 is closed to apply through the recording head 81 a voltage of polarity and magnitude corresponding with $b_0 = -1$.

When this recorded signal arrives at the pickup head 83a, a corresponding voltage is applied by way of the reversing switch 84a to the amplifier 85a. The spacing between the recording head 81 and the pickup head 83 corresponds with the spacing $\Delta$ of FIG. 6. The foregoing requirement establishes the correlation between the speed of the tape 80 and the spacing between the recording head 81 and the pickup head 83a. Since the value of $a_1$, FIG. 6, is negative, the reversing switch 84a occupies a position to apply a negative signal to the amplifier 85a. The gain of that amplifier or the fraction of the output thereof as established by the potentiometer 86a corresponds in magnitude with that of $a_1$. In terms of Equation 12, there will be produced on the coupling resistor 87a of the summing circuit 88 a voltage corresponding with the product of $b_0 a_1$. Since there are no other signals on the tape 80, there is no response from the remaining pickup heads. Accordingly, the product $b_0 a_1$ is applied by way of the output circuit 93 and conductor 82 to the recording head 81 where it is algebraically subtracted from the unit voltage derived from source 92. Thus, there has been provided a solution of Equation 12 which by inspection can be rewritten as follows:

$$b_1 = \frac{1 - b_0 a_1}{a_0} \qquad (15)$$

The pickup head 83b is spaced from the head 83a by a distance corresponding with the time interval $\Delta$ of FIG. 6. Accordingly, when the tape 80 has moved through a second distance $\Delta$, the signal representing $b_0$ will be applied by way of the reversing switch 84b to the amplifier 85b and thence to the coupling resistor 87b of the summing circuit 88. The amplifier 85b, together with its potentiometer 86b, will provide a gain corresponding with the valve of $a_2$. Thus, there will be produced at the coupling resistor 87b the product of $b_0 a_2$, the first term on the right-hand side of Equation 13. Meanwhile, a signal representative of the value of $b_1$ will have been recorded on the tape 80 by the recorder head 81, and as it arrives at the pickup head 83a there will be performed a multiplication of $b_1a_1$ which corresponds with the second term of Equation 13. The algebraic sums of these two terms will be applied from the output of the summing circuit by way of conductor 93 to the input circuit 92 for the further algebraic subtraction indicated and to record by the head 81 on tape 80 a signal corresponding with the value of $b_2$.

As the tape 80 is moved through successive incremental distances corresponding with the time interval $\Delta$ of FIG. 6, solutions for the successive equations will be obtained, these being, in summation, a solution of Equation 8 for the term $g(n-m)\Delta$. It is the foregoing $g$-term which defines the impulse response of the inverse filter 53 of FIG. 3B. As indicated in FIGS. 6 and 7, there will be twenty such equations, the general form being given in Equation 14, the subscripts $n$ being utilized both in the general form of that equation and also in identifying the circuit elements for the last pickup channel extending from the pickup 83n.

For $n=20$ or for other selected time spacings of $\Delta$, FIGS. 6 and 7, the pickup head 98 applies to the amplifier 97 of the recorder 94 input signals representative of the desired solution of Equation 8 which appears on the record chart 95 as a trace with varying amplitude in the direction of one coordinate against time as the other coordinate, the chart 35 being driven by the motor 99 at uniform speed and by way of a mechanical connection 100. Following the pickup head 98, erasing head 101 with conventional associated energizing means 102 serves to remove from the tape 80 the record applied thereto by the recording head 81.

Referring now to FIG. 9, the impulse response 96 of the inverse filter on the record chart 95 has been reproduced in association with a system having circuits and circuit components and apparatus like those of the system of FIG. 13. The system of FIG. 9 when adjusted in the manner now to be described comprises the inverse filter 53. Like FIG. 8, a motor 99 drives a magnetic tape 80 and it also drives a recorder chart 95 of a recorder 94. There are provided a plurality of pickup heads 83a, 83b, 83n corresponding in number with the time spacing $\Delta$, taken along the time coordinate of the impulse response 96. The $a$-values along the impulse response 96 determine the setting of the gain controls 86a–86n for the amplifiers 85a–85n, reversing switches such as 84a of FIG. 8 being included in the amplifier 85a and set to correspond with the polarities of the magnitudes of the $a$-values. The spacing between the pickup heads 83a–83n will again correspond with $\Delta$.

The number of pickup heads 83a–83n in general will be larger than the number employed in the system of FIG. 8. It is desirable that the entire duration or length of the impulse response of the inverse filter be represented in increments of $\Delta$. For some operations as few as 20 such pickup heads may be adequate. However, in general considerably more will be required. The number may be such that the use of an analogue system would be unduly cumbersome, dictating the desirability of carrying out in a digital device the operations diagrammatically represented by the simplified system of the drawings. For example, in one operation wherein a seismic signal type function was treated by an inverse filter, 540 points or pickup stations were employed in order to retain and restore frequency components from about zero frequency to over 500 cycles per second. Where fidelity of this order is not required, fewer points may be required to produce a velocity log-like function. In carrying out such filtering operation, a digital computer was employed.

With a seismogram including a trace such as illustrated at 24, FIG. 1, in phonographically reproducible form on the magnetic tape 80 of FIG. 8, the inverse filtering thereof will then take place as it is moved past the pickup heads 83a–83n. These pickup heads have their respective amplifiers connected to a summing circuit 88 with the output thereof applied to the recorder 94. There are produced on the chart 95 the results of the inverse filtering of the seismogram, and as previously explained, the resultant record is representative of the velocity layering represented in the seismogram. The new record approximates that of a log of borehole velocity.

In the foregoing description, the reference characters of FIG. 8 were used in the description of FIG. 9, since a single system can be used to perform the several time-domain filtering requirements described at length in connection with FIGS. 4, 8 and 9.

Now that the underlying principles of the present invention have been explained in conjunction with systems illustrative of how the invention may be practiced, it will be readily understood how other apparatus may be utilized to carry out the various needed operations. The applicability of electrical delay lines and magnetic delay lines will be obvious to those skilled in the art. The applicability of the digital computer of conventional design but programmed to operate as a time-domain filter, as explained in connection with FIGS. 4, 8 and 9, will be self-evident from the following considerations. The sampling technique utilized in establishing the $a$-values for $n\Delta$ sampling lends itself particularly well to the use of the digital computer. Such computers presently available on the market make possible on a more economical basis utilization of a relatively large number of samples as compared with the number of pickup heads required to yield a degree of resolution of a higher order than the twenty which have been referred to above.

What is claimed is:

1. A system for converting a seismogram to a velocity log which comprises a filter having an impulse response the inverse of one corresponding with the first appearing waveform on the seismogram of substantial amplitude, means for producing and applying to said filter a signal representative of said seismogram, and means connected to the output of said filter for recording said signal as modified by said filter.

2. A system of transforming a seismogram into step-like functions generally corresponding with velocity layering of subsurface formations comprising an inverse filter having an impulse response the inverse of one corresponding with the first appearing waveform of substantial amplitude on the seismogram, means for applying signals representative of said seismogram to said inverse filter, and means for recording against a time base related to that of said seismogram signals from said filter.

3. In the interpretation of seismograms on which subsurface velocity features appear as complex waveforms resulting from reflection of seismic energy from subsurface velocity features and as modified by multiple reflections between subsurface velocity contrasts, the method which comprises detonating an explosive for generating seismic waves in the earth, at a region adjacent the earth's surface and near to the location of the explosive detecting the seismic energy which travels directly from said explosive charge to said near surface region, recording at at least one location remotely located from said charge and at a near surface region subsequently arriving seismic energy appearing as said complex waveforms, and selectively attenuating those frequency components represented by the waveform of acoustic energy detected at said near surface location generally above the location of said explosive and to a degree represented by the amplitudes of the frequency components of said waveform.

4. A system for transforming a seismogram into a function representative of velocity layering of the earth comprising means for producing an impulse response $g([n-m]\Delta)$ of an inverse filter which will transform said seismogram to a step function $C(n\Delta)$, comprising means for solving the following equation $$C(n\Delta) = \sum_{m=0}^{n} (a_m) g([n-m]\Delta)$$

said means comprising a computer, where said impulse response is the inverse of one corresponding with the waveform of that component of said seismogram representative of seismic energy traveling directly from the source of seismic waves to the point of detection thereof, and means for applying in succession to said computer signals having amplitudes representative of said $a_m$ values and signals representative of said $C(n\Delta)$ values and including a summing circuit, said computer having an output circuit from which there are obtained output signals representative of the solution of $n$ number of equations of the foregoing type, where $n$ is equal to the number of amplitude samples taken from said function.

5. A system for producing a velocity profile type function from a seismic reflection function in which a direct wave component and reflection components appear at successively later points along a time scale which comprises means for generating a signal representative of said seismic reflection function, a filter connected to said last named means and having an impulse response substantially the inverse of the waveform of said direct wave component, and means connected to the output of said filter for registering said signal after passage through said filter.

6. A system for producing a velocity profile type function from a seismic reflection type function in which a direct seismic wave component and seismic reflection components appear at successively later points along a time scale which comprises means for generating a signal representative of said seismic reflection type function, means for generating from said signal a plurality of signal components in dependence upon a filtering function substantially the inverse of said direct wave component, means for adding said plurality of signal components to produce an output function, and means for registering said output function as a dependent variable with a function representative of said time scale as the independent variable.

7. The method of producing a velocity profile type function from a seismic reflection function in which a direct wave component and reflection components appear at successively later points along a time scale which comprises generating from said seismic reflection function a plurality of signal components in dependence upon a filtering function substantially the inverse of said direct wave component, adding said plurality of signal components to produce an output function, and registering said output function as a dependent variable with a function representative of said time scale as the independent variable.

References Cited in the file of this patent

UNITED STATES PATENTS

| | | |
|---|---|---|
| 2,355,826 | Sharpe | Aug. 15, 1944 |
| 2,757,357 | Peterson | July 31, 1956 |
| 2,791,288 | Meier | May 7, 1957 |
| 2,794,965 | Yost | June 4, 1957 |
| 2,916,724 | Peterson | Dec. 8, 1958 |

OTHER REFERENCES

Wadsworth et al.: "Geophysics," July 1953, pages 539–586.

Peterson et al.: "Geophysics," July 1955, pages 516–538.

Jones et al.: "Geophysics," October 1955, pages 745, 765.